United States Patent [19]
Thompson

[11] 4,323,209
[45] Apr. 6, 1982

[54] COUNTER-ROTATING VORTICES GENERATOR FOR AN AIRCRAFT WING

[76] Inventor: Roger A. Thompson, 7606 Joplin, Apt. 2, Houston, Tex. 77087

[21] Appl. No.: 960,221

[22] Filed: Nov. 13, 1978

Related U.S. Application Data

[63] Continuation-in-part of Ser. No. 816,732, Jul. 18, 1977, abandoned.

[51] Int. Cl.³ .............................................. B64C 23/06
[52] U.S. Cl. .................................... 244/199; 244/201
[58] Field of Search ............... 244/198, 199, 200, 201, 244/204, 213, 214, 206, 210, 130

[56] References Cited

U.S. PATENT DOCUMENTS

| | | | |
|---|---|---|---|
| 1,787,321 | 12/1930 | Orr | 244/198 |
| 2,036,905 | 4/1936 | Weick | 244/198 |
| 2,358,985 | 9/1944 | McAndrew | 244/201 |
| 2,559,823 | 7/1951 | Klose | 244/113 X |
| 2,740,596 | 4/1956 | Lee | 244/199 |
| 2,743,888 | 5/1956 | Lippisch | 244/199 |
| 2,764,373 | 9/1956 | Anderson et al. | 244/199 |
| 2,800,291 | 7/1957 | Stephens | 244/200 |
| 3,008,291 | 11/1961 | Hardgrave | 244/200 X |
| 3,129,908 | 4/1964 | Harper | 244/219 |
| 3,195,836 | 7/1965 | Alvarez-Calderon | 244/216 |
| 3,288,399 | 11/1966 | Gaster | 244/198 |
| 3,463,418 | 8/1969 | Miksch | 244/199 |
| 3,471,107 | 10/1969 | Ornberg | 244/199 |
| 3,744,745 | 7/1973 | Kerker et al. | 244/199 |
| 3,776,363 | 12/1973 | Kuethe | 244/199 |

FOREIGN PATENT DOCUMENTS

| | | | |
|---|---|---|---|
| 1809593 | 9/1970 | Fed. Rep. of Germany | 244/199 |
| 260059 | 10/1926 | United Kingdom . | |
| 275638 | 4/1928 | United Kingdom . | |
| 289517 | 4/1928 | United Kingdom | 244/214 |
| 377178 | 7/1932 | United Kingdom | 244/198 |
| 446094 | 10/1936 | United Kingdom . | |
| 645187 | 10/1950 | United Kingdom . | |
| 818188 | 8/1959 | United Kingdom . | |
| 829753 | 3/1960 | United Kingdom | 244/207 |
| 837553 | 6/1960 | United Kingdom . | |
| 918311 | 2/1963 | United Kingdom . | |
| 918325 | 2/1963 | United Kingdom . | |
| 977506 | 12/1964 | United Kingdom . | |
| 1087784 | 10/1967 | United Kingdom . | |
| 1281753 | 7/1972 | United Kingdom . | |

OTHER PUBLICATIONS

Pearcey, "Shock Induced Separation and Its Prevention", *Boundary Layer & Flow Control*, vol. 2, 1961, pp. 1278–1279.

*Primary Examiner*—Charles E. Frankfort
*Attorney, Agent, or Firm*—Arnold, White & Durkee

[57] ABSTRACT

A device for enhancing the lift capability of an aircraft wing is characterized by at least one forwardly projecting finger member mounted on the leading edge of the wing. The finger generates counter-rotating vortices, each in contact with the other, trailing backwardly across substantially the entire upper surface of the wing behind the fingers as the airflow moves upwardly and around the lateral edges of the finger. As the counter-rotating vortices trail backwardly over the upper surface of the wing, a blockage effect is created and the airflow patterns across the wing are modified to produce an increase in lift.

13 Claims, 12 Drawing Figures

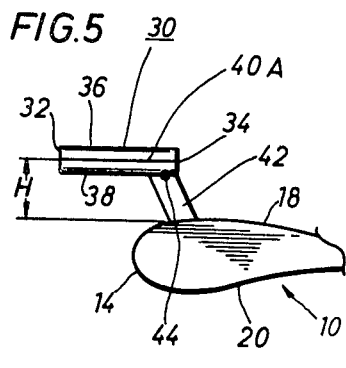
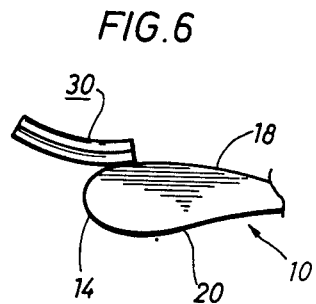
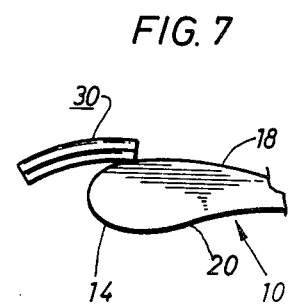
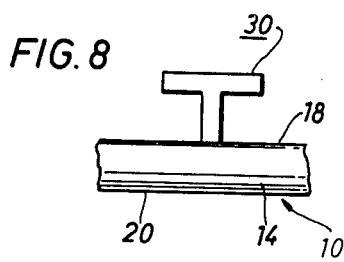
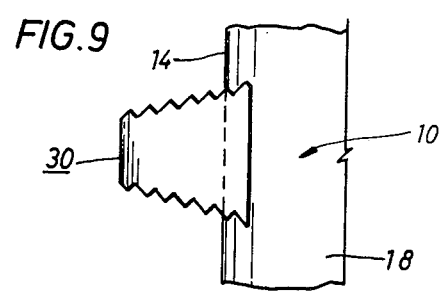
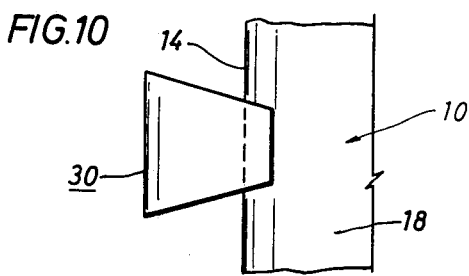
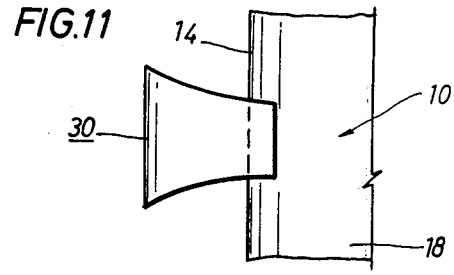
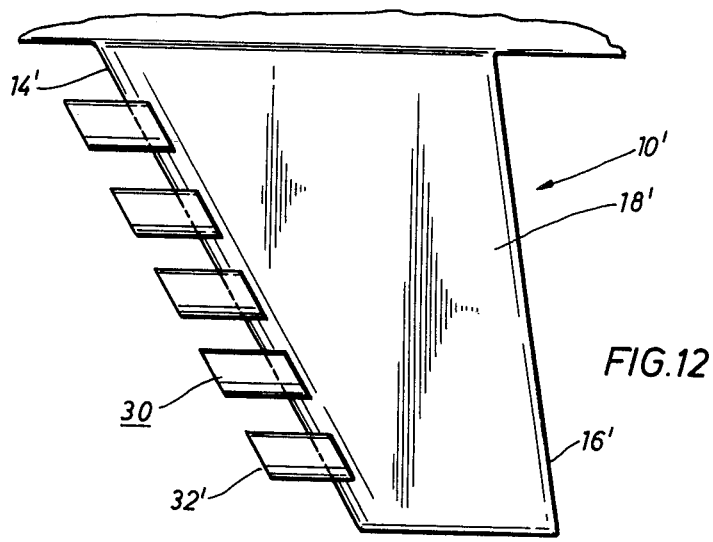

COUNTER-ROTATING VORTICES GENERATOR FOR AN AIRCRAFT WING

CROSS-REFERENCE TO RELATED APPLICATION

This application is a continuation-in-part of Application Ser. No. 816,732, issued July 18, 1977, now abandoned.

BACKGROUND OF THE INVENTION

1. Field of the Invention

This invention relates to a device for increasing the lift capability of aircraft wings.

2. Description of the Prior Art

Lift of an airplane wing is a function of its forward speed and angle of attack. For each type of wing there is an upper limit to the angle of attack that can be effectively reached, beyond which a stall suddenly occurs with almost total loss of lift. Therefore, in order to accommodate larger and heavier aircraft, it is necessary that progressly higher takeoff and landing velocities be maintained in order to prevent stall of the wing and the loss of lift capability. It would be advantageous, therefore, to increase the lift capability of aircraft wings by more efficiently utilizing the airflow across the top surface of the wing.

SUMMARY OF THE INVENTION

In combination with an aircraft wing, this invention relates to a wing lift device including at least one, but preferably a plurality, of laterally spaced, forwardly extending finger members mounted adjacent to the forward edge of the airfoil. The fingers may be mounted directly on the airfoil or supported a predetermined distance therabove by suitable struts or the like. The forwardly extending fingers obstruct the airflow impinging thereon at predetermined angles of attack so as to generate counter-rotating vortices trailing backwardly therefrom over substantially the entire upper surface of the wing that lies behind the fingers as the airflow moves upwardly and over the lateral edges of the fingers. The fingers are sized and configured such that the counter-rotating vortices produced thereby are in contact one with the other and remain intact as vortices as they extend backwardly and trail over the upper surface of the aircraft wing. As a result of the counter-rotating vortices, a blockage effect is created which modifies the airflow patterns across the upper surface of the wing and produces increased lift capability of the wing.

BRIEF DESCRIPTION OF THE DRAWINGS

The invention will be more fully understood from the following detailed description of a preferred embodiment thereof, taken in connection with the accompanying drawings, which form a part of the specification, and in which:

FIG. 5 is a fragmentary view of an alternate mode of attachment of the wing lift device to an aircraft wing;

FIGS. 6, 7, 8, 9, 10, 11 and 12 are alternate embodiments of the invention.

DESCRIPTION OF THE PREFERRED EMBODIMENT

Figure 1:
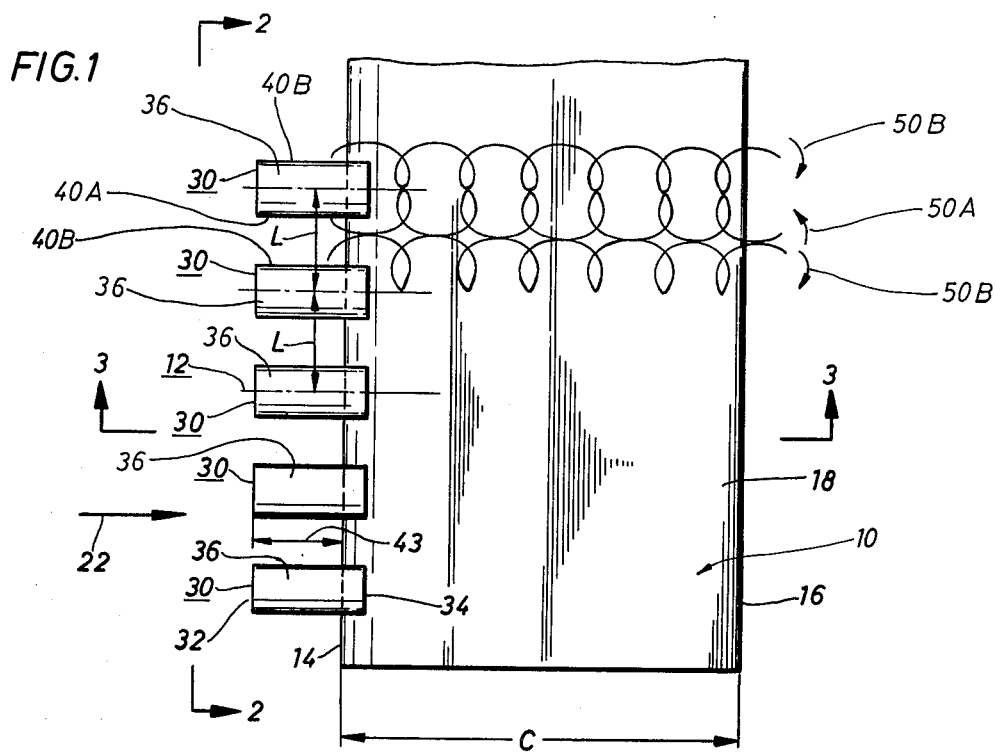
FIG. 1 is a plan view of an aircraft wing illustrating a wing lift device embodying the teachings of this invention.

Throughout the following description, similar reference numerals refer to similar elements in all figures of the drawings.

Figure 2:
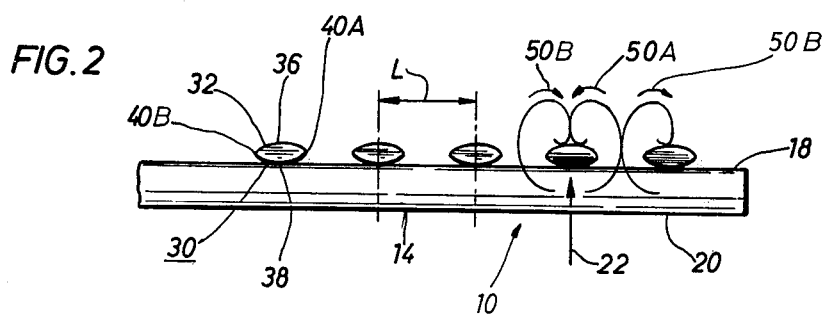
FIG. 2 is a front view taken along line 2—2 of FIG. 1.
Figures 3, 4:
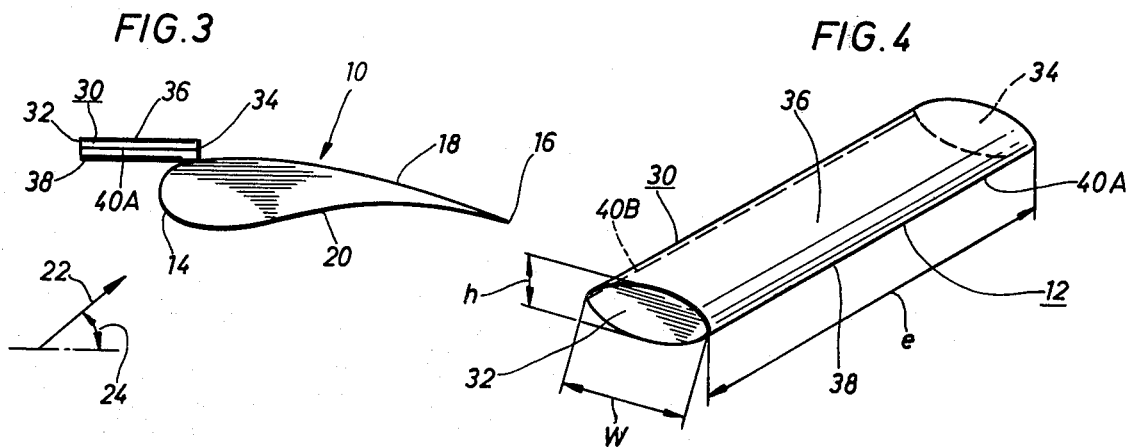
FIG. 3 is a section view of the wing of FIG. 1.
FIG. 4 is an isolated perspective view of one embodiment of a wing lift device in accordance with the teachings of the invention.

Referring to FIGS. 1 through 3, an aircraft wing, generally indicated by reference numeral 10, of known airfoil configuration as viewed in the cross section of FIG. 3 is shown in isolation from the remainder of the aircraft fuselage and like structures with which it is normally associated. It is understood that the wing 10 may be either a conventional straight wing or a sweptback wing and still be utilizable in connection with a wing lift device generally indicated by reference numeral 12 embodying the teachings of this invention.

The wing 10 includes a forward or leading edge 14 and a rearward or trailing edge 16. An upper surface 18 and a lower surface 20 are interposed to connect the forward and rearward edges 14 and 16, respectively. The width C of the wing 10 is the distance between the leading edge 14 and trailing edge 16 of the wing 10. For definitional purposes, the wing 10 will be assumed to be confronted by an airflow indicated by a vector 22 approaching the leading edge 14 of the wing 10 from the lower forward direction defining a predetermined angle of attack 24 with respect to a horizontal datum.

Mounted adjacent to the leading edge 14 of the wing 10 is at least one, but preferably a plurality, of laterally spaced, forwardly extending finger members 30. As viewed in the figures, the fingers 30 are provided with a forward and trailing edge 32 and 34, respectively, and are also provided with upper surfaces 36 and lower surfaces 38. The upper and lower surfaces 36 and 38 meet at lateral edges 40A and 40B. As is discussed more fully herein, the fingers 30 define a predetermined cross sectional area when viewed as along section lines 2—2 in FIG. 1. As shown in FIGS. 2 and 4, the fingers 30 are preferably biconvex in cross section. The fingers 30 may be mounted directly to the upper surface 18 of the wing 10 adjacent the leading edge 14 thereof (as illustrated in FIG. 2) or, alternatively, as illustrated in FIG. 5, may be mounted a predetermined distance H thereabove on suitable struts 42 or the like. The fingers 30 may be pivotally mounted, if desired. If it is desired to pivotally mount the fingers, this can be done by setting them in a gimbal mounting with vertical and transverse axes to allow for side-to-side and up-and-down rotational motions, respectively. Rotations about other axes can be used. The motions can be accomplished by means of a lever arm extending from each axis, at the end of which is a nut through which a threaded bolt is passed to form a jackscrew. An electric or hydraulic motor can be used to power the jackscrew. This mechanism allows the fingers to be positioned in any attitude and to be held rigidly in that attitude. It should be appreciated that once an attitude of the finger is selected, the fingers are to remain rigidly and securely in place.

An alternative mechanism would include a linear actuator to move the lever arms, with detents and an appropriate latching device such as a pin to fit the detent, the detents being located to obtain the best average position for two, or perhaps more, flight conditions. The actuator can be electrically or hydraulically powered. It is appreciated that any suitable means may be utilized to mount the fingers, move them in side-to-side and in up-and-down rotational motions, and rigidly secure them in a selected attitude in accordance with the invention.

By whatever mode of attachment utilized, the fingers are in spaced lateral adjacency a predetermined distance L between centerlines of adjacent fingers 30. By spaced lateral adjacency it is meant that adjacent fingers 30 are close enough together that adjacent vortices are in contact with each other. Referring to FIG. 4, it is seen that each finger 30 has a predetermined length l (measured along the forwardly projecting direction of the fingers), width w (measured in a direction transverse to the forward direction), and height h, defined in accordance with FIG. 4. Although in the preferred case, the length l of the fingers is greater than the width thereof, in some cases, the length and width dimensions may be equal. Thus, the forward dimension l of the finger is at least equal to but preferably greater than its transverse dimension w, both measured as defined.

In practical application, each aircraft wing will have appropriately configured and dimensioned fingers 30 for generating counter-rotating vortices of sufficient size and strength to remain intact until they reach substantially to or past the trailing edge of the wing. That is to say, the fingers 30 are configured, dimensioned and mounted on the wing so as to generate a pair of counter-rotating, contacting vortices which remain intact and do not dissipate over substantially the entire width of the wing behind the fingers. In some instances, it is desirable to generate vortices which remain intact over the entire width of the wing. Fingers 30, appropriately configured and projecting forwardly a sufficient distance to generate vortices strong enough to accomplish this end are construed to lie within the contemplation of this invention. Note, as discussed above that vortices from adjacent fingers 30 also contact each other. By way of example, suitable values for finger dimensions, in terms of the width of the wing C include: projection of the finger 30 forward of the edge 14 of the wing (distance 43, FIG. 1), 0.29 C; width w of finger, 0.167 C; spacing L between fingers 30, 0.333 C.

The fingers 30 may exhibit any of a predetermined plurality of configurations, as illustrated in FIGS. 6, 7, 8, 9, 10 and 11. The fingers 30 may either be upwardly curved, as viewed from the side as shown in FIG. 6, downwardly curved as viewed from the side as shown in FIG. 7, or may be T-shaped in cross section as viewed from the frontal view shown in FIG. 8. Further, as viewed in plan, the fingers 30 may be trapezoidal, with the short base extending forward of the edge 14 (FIG. 9) or the long base forward of the edge 14 (FIGS. 10 and 11). Further, the sides of the trapezoid may be straight (FIG. 10), serrated (FIG. 9) or curved (FIG. 11), whether the short or long base is forwardly extending. The fingers, when viewed in plan, may also be triangular in form.

As mentioned above, suitable means may be provided for extending the fingers 30 to their forwardly extending position adjacent the leading edge 14 of the wing 10, and retracting the fingers into a recess provided within the wing (not shown), or disposing the finger 30 to any intermediate position therebetween. For extending or retracting the fingers, the fingers may be mounted on guides to allow sliding motion, and either a jackscrew or a linear actuator with detents used to power the motion. A gimbal system as described above can be included with the fingers mounted on the guides to simultaneously provide rotational motion. Furthermore, as viewed in FIG. 5, the fingers 30 may be pivotally mounted, as at 44, with the points of attachment of the finger 30 to the strut 42, or between the strut 42 and the surface 18 of the wing 10, so as to be moveable either upwardly or downwardly, laterally from side-to-side, or both, as may be necessary in certain situations.

In operation, the wing lift device 12, including the fingers 30, has the effect of changing the airflow patterns with respect to the upper surface 18 of the wing 10. This is believed to be an effect of a counter-rotating vortex system (FIGS. 1 and 2) trailing rearwardly from the fingers 30. As the airflow vector 22 impinges on the lower surfaces 38 of the fingers 30, the flow moves upwardly and around the lateral edges 40A and 40B of the fingers 30 to respectively generate side-by-side counter-rotating vortices 50A and 50B (illustrated diagrammatically in FIGS. 1 and 2). By "counter-rotating vortices" it is meant that the pair of vortices 50A and 50B produced from each finger 30 are close enough together as to be in contact with and reinforce the other as they trail rearwardly in oppositely rotating directions across the surface of the wing behind the fingers. As seen from the front (as diagrammatically illustrated in FIG. 2), the vortex 50B rotates in a clockwise direction as it trails rearwardly over the upper surface 18 of the wing 10. The vortex 50A rotates in a counterclockwise direction as it trails rearwardly over the upper surface 18 of the wing 10. Although the vortices 50A and 50B are shown in FIGS. 1 and 2 as trailing from different ones of the fingers 30 for purposes of illustrative convenience, one skilled in the art will appreciate from the foregoing that a counter-rotating vortex system trails rearwardly from each of the fingers 30.

A consequence of the counterrotating vortices is that the lift capability of the wing 10 is increased for a given angle of attack and airspeed. Alternatively, decreased angles of attack or lower airspeeds would be required to maintain the lift capability of the wing at a predetermined value. As a result takeoffs and landings at slower speeds and with shorter runways may be accomplished through the utilization of the wing lift device embodying the teachings of this invention.

Each of the projecting fingers 30 generate the counter-rotating vortices 50A and 50B, as discussed above, covering the upper surface 18 behind the fingers. As these vortices trail rearwardly over the top surface 18 of the wing a possible mode of action is that these vortices 50 induce a second set of vortices above them which together create a blockage effect above the wing surface 18. As a result the airflow over the upper surface 18 "humps" over the wing as if the wing curvature were greater than it actually is. Consequently, increased lift is generated from the wing. It is also noted that the airflow over the upper surface 18 of the wing does not sweep forwardly over the wing (the characteristic of the stall condition) until high angles of attack well past the usual stall region are attained. The fingers 30 projecting forwardly from the wing 10 generate increased lift from the wing over a wide range of angles of attack from very low values (where there is no stall even with conventional wings), through angles of attack in the usual stall region, to relatively high angles of attack. The angularity and location of the fingers should be such that an obstruction of the airflow over the wing does not take place. The fingers should be arranged to provide a smooth, continuous airflow over the upper wing surface. If the fingers are attached to the leading edge of the wing (as FIGS. 1–3, for example), each finger should be smoothly tangentially mounted with respect to the wing's surface. (The exaggerated step-discontinuity of the edge 34 with respect to the wing 10 which appears in FIG. 3 is the result of an attempt to clearly show the finger and its location at the leading edge of the wing. In practice, the trailing edge 34 is smoothly connected to the surface of the wing.). By "continuous airflow," it is meant that the fingers should be positioned so as not to provide a spoiler effect. When the fingers are located above the wing (as in FIGS. 5 and 8), these above-discussed considerations are not present, since the space between the wing and the finger disposed thereabove allows a continuous airflow over the wing's surface to occur.

As seen from FIG. 12, the fingers 30 may be used adjacent the leading edge 14' of a swept back wing 10'. The fingers 30 have, if necessary, the leading edges 32' thereof angled along a common plane, as illustrated in FIG. 12, to prevent mutual interference. The angled leading edges 32' may or may not be extended parallel to the leading edge 14' of the swept back wing.

Having described a preferred embodiment of the invention, those skilled in the art may effect modifications thereto in view of the teachings herein provided. Yet, it is understood that these modifications are within the contemplation of this invention, as defined in the appended claims.

What is claimed is:

1. Apparatus for increasing the lift generated by an aircraft wing, having upper and lower surfaces, while propelled through a fluid medium comprising:
    a finger mounted adjacent to the leading edge of the wing and extending forwardly therefrom, said finger having a first dimension measured with respect to the forward direction and a second dimension measured in a direction transverse thereto, said finger having lateral edges thereon;
    said finger being mounted on the wing such that as the wing is propelled through the fluid medium impingement of the fluid medium on said finger produces, by flow around said lateral edges, a first and a second vortex trailing rearwardly from said finger over the wing in the direction of the fluid flow, each of said vortices being in contact with and counter-rotating with respect to the other;
    said finger being sized such that each vortex produced thereby is of sufficient size and strength to modify the flow pattern above the boundary layer on the wing upper surface so as to effect an increase in the lift; and
    mounting struts for supporting said finger above the surface of the wing at the leading edge thereof.

2. Apparatus for increasing the lift generated by an aircraft wing, having upper and lower surfaces, while propelled through a fluid medium comprising:
    a finger mounted adjacent to the leading edge of the wing and extending forwardly therefrom, said finger having a first dimension measured with respect to the forward direction and a second dimension measured in a direction transverse thereto, said finger having lateral edges thereon;
    said finger being mounted on a wing such that as the wing is propelled through the fluid medium impingement of the fluid medium on said finger produces, by flow around said lateral edges, a first and a second vortex trailing rearwardly from said finger over the wing in the direction of fluid flow, each of said vortices being in contact with and counter-rotating with respect to the other;
    said finger being sized such that each vortex produced thereby is of sufficient size and strength to modify the flow pattern above the boundary layer on the wing upper surface so as to effect an increase in the lift; and
    said finger is pivotable upwardly and downwardly relative to the upper surface of the wing.

3. The wing lift device of claim 2 wherein said finger is pivotable laterally from side-to-side with respect to the surface of the wing.

4. Apparatus for increasing the lift generated by an aircraft wing, having upper and lower surfaces, while propelled through a fluid medium comprising:
    a finger mounted adjacent to the leading edge of the wing and extending forwardly therefrom, said finger having a first dimension measured with respect to the forward direction and a second dimension measured in a direction transverse thereto, said finger having lateral edges thereon,
    said finger being mounted on a wing such that as the wing is propelled, through the fluid medium impingement of the fluid medium on said finger produces, by flow around said lateral edges, a first and a second vortex trailing rearwardly from said finger over the wing in the direction of the fluid flow, each of said vortices being in contact with and counter-rotating with respect to the other;
    said finger being sized such that each vortex produced thereby is of sufficient size and strength to modify the flow pattern above the boundary layer on the wing upper surface so as to effect an increase in the lift; and
    said finger is pivotable laterally from side-to-side relative to the upper surface of the wing.

5. Apparatus for increasing the lift generated by an aircraft wing, having upper and lower surfaces, while propelled through a fluid medium comprising:
    a finger, substantially T-shaped in frontal cross section, mounted adjacent to the leading edge on the wing and extending forwardly therefrom, said finger having a first dimension measured with respect to the forward direction and a second dimension measured in a direction transverse thereto, said finger having lateral edges thereon;
    said finger being mounted on the wing such that as the wing is propelled through the fluid medium impingement of the fluid medium on said finger produces, by flow around said lateral edges, a first and a second vortex trailing rearwardly from said finger over the wing in the direction of fluid flow, each of said vortices being in contact with and counter-rotating with respect to the other; and
    said finger being sized such that each vortex produced thereby is of sufficient size and strength to modify the flow pattern above the boundary layer on the wing upper surface so as to effect an increase in the lift.

6. Apparatus for increasing the lift generated by an aircraft wing, having upper and lower surfaces, while propelled through a fluid medium comprising:
    a finger, substantially curved upwardly with respect to the upper surface of the wing, mounted adjacent to the leading edge of the wing and extending forwardly therefrom, said finger having a first dimension and a second dimension measured in a direction transverse thereto, said finger having lateral edges thereon;

said finger being mounted on the wing such that as the wing is propelled through the fluid medium impingement of the fluid medium on said finger produces, by flow around said lateral edges, a first and a second vortex trailing rearwardly from said finger over the wing in the direction of fluid flow, each of said vortices being intact with and counter-rotating with respect to the other; and said finger being sized such that each vortex produced thereby is of sufficient size and strength to modify the flow pattern above the boundary layer on the wing upper surface so as to effect an increase in the lift.

7. Apparatus for increasing the lift generated by an aircraft wing, having upper and lower surfaces, while propelled through a fluid medium comprising:

a finger, substantially curved downwardly with respect to the upper surface of the wing, mounted adjacent to the leading edge of the wing and extending forwardly therefrom, said finger having a first dimension and a second dimension measured in a direction transverse thereto, said finger having lateral edges thereon;

said finger being mounted on a wing such that as the wing is propelled through the fluid medium impingement of the fluid medium, on said finger produces, by flow around said lateral edges, a first and a second vortex trailing rearwardly from said finger over the wing in the direction of fluid flow, each of said vortices being intact with and counter-rotating with respect to the other;

said finger being sized such that each vortex produced thereby is of sufficient size and strength to modify the flow pattern above the boundary layer on the wing upper surface so as to effect an increase in the lift.

8. Apparatus for increasing the left generated by an aircraft wing, having upper and lower surfaces, while propelled through a fluid medium comprising:

a finger, substantially trapezoidal in plan, mounted adjacent to the leading edge of the wing and extending forwardly therefrom, said finger having a first dimension and a second dimension measured in a direction transverse thereto, said finger having lateral edges thereon;

said finger being mounted on the wing such that as the wing is propelled through the fluid medium impingement of the fluid medium on said finger produces, by flow around said lateral edges, a first and a second vortex trailing rearwardly from said finger over the wing in the direction of fluid flow, each of said vortices being intact with and counter-rotating with respect to the other; and said finger being sized such that each vortex produced thereby is of sufficient size and strength to modify the flow pattern above the boundary layer on the wing upper surface so as to effect an increase in the lift.

9. The wing lift device of claim 8 wherein the long base of said finger is mounted adjacent to the leading edge of the wing.

10. The wing lift device of claim 9 wherein the short base of the trapezoid is mounted adjacent to the wing attachment point at the leading edge of the aircraft wing.

11. The wing lift device of claim 8 wherein the sides of the trapezoid are straight lines.

12. The wing lift device of claim 8 wherein the sides of the trapezoid and curved lines.

13. Apparatus for increasing the lift generated by an aircraft wing, having upper and lower surfaces, while propelled through a fluid medium comprising:

a finger mounted adjacent to the leading edge of the wing and extending forwardly therefrom, said finger having a first dimension measured with respect to the forward direction and a second dimension measured in a direction transverse thereto, said finger having lateral edges thereon;

said finger being mounted on the wing such that as the wing is propelled through the fluid medium impingement of the fluid medium on said finger produces, by flow around said lateral edges, a first and a second vortex trailing rearwardly from said finger over the wing in the direction of fluid flow, each of said vortices being intact with and counter-rotating with respect to the other;

said finger being sized such that each vortex produced thereby is of sufficient size and strength to modify the flow pattern above the boundary layer on the wing upper surface so as to effect an increase in the lift;

a second finger mounted at the forward edge of the aircraft wing in spaced lateral adjacency to said first finger, said second finger having lateral edges thereon, impingement of an air flow on the second finger generating, by flow around said lateral edges, a second set of contacting, counter-rotating vortices, trailing rearwardly over the upper surface of the wing, one of said second set of vortices being in contact with one of said vortices generated from said first finger, the vortices acting to modify the flow pattern over the lifting surface to increase the lift generated therefrom; and wherein said fingers are of rectangular planform and substantially biconvex in frontal cross section and wherein said contacting opposed vortices produced therefrom remain intact as vortices above the entire upper surface of the wing behind the fingers, and wherein said vortices produced by said fingers contact each other.

* * * * *

UNITED STATES PATENT AND TRADEMARK OFFICE
CERTIFICATE OF CORRECTION

PATENT NO. : 4,323,209
DATED : April 6, 1982
INVENTOR(S) : Roger A. Thompson

It is certified that error appears in the above—identified patent and that said Letters Patent is hereby corrected as shown below:

Column 1, line 8, delete "issued" and insert --filed--;

line 63, change "line" to --lines--.

Column 4, line 36, change "counterrotating" to --counter-rotating--.

Column 8, line 7, change "9" to --8--;

line 14, change "and" to --are--.

Signed and Sealed this

Fifteenth Day of June 1982

[SEAL]

Attest:

Attesting Officer

GERALD J. MOSSINGHOFF
Commissioner of Patents and Trademarks